(12) United States Patent
Lin

(10) Patent No.: US 9,110,250 B2
(45) Date of Patent: Aug. 18, 2015

(54) FLEXIBLY BENDED BOOT FOR OPTICAL FIBER CONNECTOR

(71) Applicant: Yu-Ching Lin, Kaohsiung (TW)

(72) Inventor: Yu-Ching Lin, Kaohsiung (TW)

( * ) Notice: Subject to any disclaimer, the term of this patent is extended or adjusted under 35 U.S.C. 154(b) by 0 days.

(21) Appl. No.: 14/267,129

(22) Filed: May 1, 2014

(65) Prior Publication Data

US 2015/0153516 A1 Jun. 4, 2015

(30) Foreign Application Priority Data

Dec. 2, 2013 (TW) .............................. 102144308 A

(51) Int. Cl.
*G02B 6/36* (2006.01)
*G02B 6/38* (2006.01)
*G02B 6/44* (2006.01)

(52) U.S. Cl.
CPC ............ *G02B 6/3825* (2013.01); *G02B 6/3887* (2013.01); *G02B 6/3807* (2013.01); *G02B 6/44* (2013.01); *G02B 6/4478* (2013.01)

(58) Field of Classification Search
CPC ...... G02B 6/3807; G02B 6/3887; G02B 6/44; G02B 6/4478
USPC .................................. 385/53–55, 69, 86–88
See application file for complete search history.

(56) References Cited

U.S. PATENT DOCUMENTS

| | | | | |
|---|---|---|---|---|
| 5,037,175 A | * | 8/1991 | Weber | 385/76 |
| 5,347,603 A | * | 9/1994 | Belenkiy et al. | 385/86 |
| 5,640,476 A | * | 6/1997 | Womack et al. | 385/86 |
| 5,710,851 A | * | 1/1998 | Walter et al. | 385/86 |
| 5,933,557 A | * | 8/1999 | Ott | 385/86 |
| 6,134,370 A | * | 10/2000 | Childers et al. | 385/135 |
| 6,634,801 B1 | * | 10/2003 | Waldron et al. | 385/86 |
| 7,029,182 B2 | * | 4/2006 | Ngo | 385/53 |
| 7,460,753 B2 | * | 12/2008 | Kewitsch | 385/113 |
| 7,490,997 B2 | * | 2/2009 | Verhagen | 385/86 |
| 8,639,082 B2 | * | 1/2014 | Haley et al. | 385/136 |
| 2008/0247710 A1 | | 10/2008 | Oike et al. | |
| 2011/0056246 A1 | | 3/2011 | Nishioka et al. | |
| 2012/0328248 A1 | | 12/2012 | Larson et al. | |

* cited by examiner

*Primary Examiner* — Ryan Lepisto
*Assistant Examiner* — Guy Anderson
(74) *Attorney, Agent, or Firm* — Rosenberg, Klein & Lee

(57) ABSTRACT

A boot for an optical fiber adapter according to the present disclosure is provided. The boot includes an elastic hollow cylinder and a shape-maintainable member. The hollow cylinder defines an axial direction and the shape-maintainable member is formed on inner surfaces of the hollow cylinder. According to the present disclosure, the boot may be bent to a desired shape in subjection to an external mechanical force. When the boot is bent, the shape-maintainable member will also be bent accordingly. The boot may still be kept in the desired shape even though when the external mechanical force is removed. The boot may be bent to an original shape with an appropriate mechanical force.

15 Claims, 7 Drawing Sheets

FLEXIBLY BENDED BOOT FOR OPTICAL FIBER CONNECTOR

RELATED APPLICATION

The present application is based on and claims priority to Taiwanese Application Number 102144308, filed Dec. 2, 2013, the disclosure of which is hereby incorporated by reference herein in its entirety.

BACKGROUND

1. Technical Field

The disclosure relates to an optical fiber connector, and more particularly, to a boot for an optical fiber connector.

2. Description of the Related Art

The application of fiber optics to the telecommunication and data storage industries is expanding every day. Fiber optics enables the high-speed transmission of communications and data. Connectors for optical fibers can be found in the back of instrumentation, telecommunication, routing, and switching cabinets. These cabinets accept a large number of fiber optical connectors. The optical fibers project away from the connector and tend to bend toward the ground due to the effect of gravity or the optical fibers are bent in a different direction due to an externally applied force. An optical signal passing through an optical fiber can experience a power loss if the bend radius of the optical fiber is too great. In order to prevent the optical fiber from being bent beyond a minimum bend radius, strain relief boots can be attached to the optical fiber in a region adjacent to the connector. The strain relief boot provides for a gentle, smooth, non-abrupt transition of the optical fiber from the connector to some other environment so as to maintain the optical signal at an acceptable power level.

Typically, strain relief boots have a straight, unbent shape when they are not subject to an externally applied force. Such a strain relief boot is disclosed in U.S. Pat. No. 5,781,681. FIG. 1 is taken from U.S. Pat. No. 5,781,681 showing a prior art connector 100. The prior art connector 100 includes the prior art optical fiber 110 which is surrounded, adjacent to the connector 100, by the prior art strain relief boot 120. When the prior art optical fiber 110 is subjected to a side load, such as the gravity, the strain relief boot 120 will bend. If the side load is too heavy, the boot 120 will bend greatly to cause a microbending loss of the fiber 110. Moreover, when a great number of fibers 110 are arranged in the above-mentioned cabinets, it is usually required to bundle these fiber 110 together. This will also cause the boot 120 to bend.

In order to solve the above problem, referring to FIG. 2, U.S. Pat. No. 6,634,801 discloses an adjustable strain relief boot 200 for an optical fiber connector. The strain relief boot 200 includes a stationary portion 220 and a moving portion 230 slidably connected to the stationary portion 220. The bending angle of the boot 200 can be adjusted by moving the moving portion 230.

However, the bending angle of the boot 200 is adjusted through teeth. The teeth will cause the bending angle not to be adjusted arbitrarily. Furthermore, the mechanism of the moving portion 230 is somewhat complicated and the boot 200 can be angled only in a direction.

In addition, referring to FIGS. 3 and 4, a flexibly bended boot 300 for an optical fiber connector is provided with a protrusion portion 330 formed on a cylindrical body 310, wherein an iron wire 340 is embedded in the protrusion portion 330.

When the boot 300 is bent to a desired shape in subjection to an external force, the iron wire 340 will also be bent accordingly. The boot 300 may still be kept in the desire shape even though when the external force vanishes. The boot 300 may be bent to an original shape with an appropriate force.

In general, the protrusion portion 330 and cylindrical body 310 are plastics. It is well-known that plastics are difficult to combine with iron. Therefore, it is easy to separate the iron wire 340 from the protrusion portion 330. Furthermore, the mass production of the boot 300 by machine is also difficult to achieve.

Accordingly, there exists a need to provide a solution to solve the aforesaid problems.

SUMMARY

The present disclosure provides a flexibly bended boot for an optical fiber connector.

In one embodiment, the boot of the present disclosure includes an elastic hollow cylinder and a shape-maintainable member. The hollow cylinder defines an axial direction and the shape-maintainable member is formed on inner surfaces of the hollow cylinder. According to the present disclosure, the boot may be bent to a desired shape in subjection to an external mechanical force. When the boot is bent, the shape-maintainable member will also be bent accordingly. The boot may still be kept in the desired shape even though when the external mechanical force is removed. The boot may be bent to an original shape with an appropriate mechanical force.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
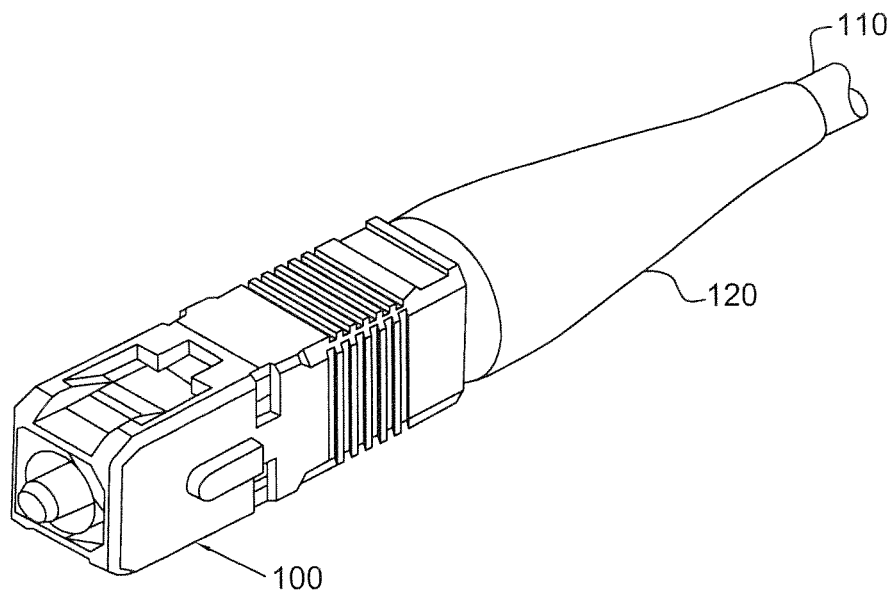
FIG. 1 illustrates a conventional boot for an optical fiber connector.
Figure 2:
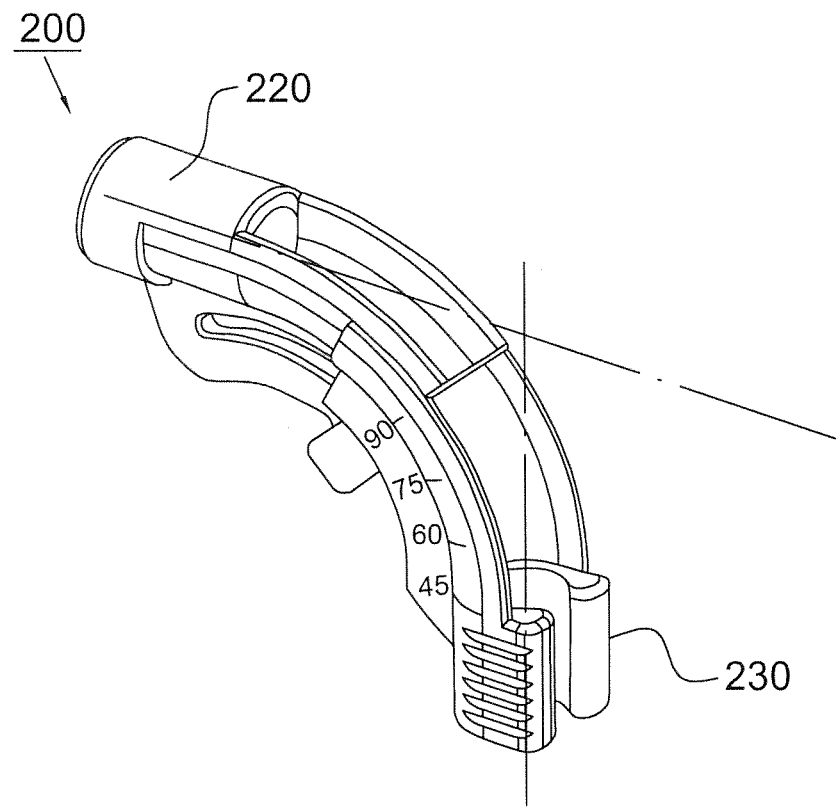
FIG. 2 illustrates a conventional adjustable boot for an optical fiber connector.

Referring to FIGS. 5 to 9, the flexibly bended boot 500 of the present disclosure is configured to connect with an optical fiber connector. The boot 500 includes an elastic hollow cylinder 510, which is cylindrical and defines an axial direction 520. The hollow cylinder 510 may surround an optical fiber connected with the optical fiber connector. A protrusion portion 530 is integrally formed on the outer surfaces of the hollow cylinder 510 and extends from the rear end 514 toward the front end 516 of the hollow cylinder 510 in the axial direction 520. A plurality of parallel grooves 532 is formed at the protrusion portion 530. An opening 534 is formed at the rear end 514 of the protrusion portion 530. In addition, a shape-maintainable member 540 is embedded in the hollow cylinder 510 and exposed out from the inner surfaces of the hollow cylinder 510. The shape-maintainable member 540 includes a cylindrical hollow body 542 embedded on the inner surfaces of the hollow cylinder 510. An axial breach 547 is formed in the hollow body 542 and extends from one end to arrive at the other end thereof. A pair of axial extending portions 541 extends from one end of the body 542 to arrive at the front end 516 of the hollow cylinder 510 and is embedded symmetrically on the inner surfaces of the hollow cylinder 510. Indentations 546 are formed on the respective inner surfaces of the extending portion 541. An axial ridge portion 544 extends from the other end of the body 542 to arrive at the rear end 514 of the hollow cylinder 510 and is embedded in the protrusion portion 530, wherein the ridge portion 544 is exposed out from the grooves 532 and inner surfaces of the hollow cylinder 510. An indentation 545 is formed on the ridge portion 544. An opening 548 is formed at the rear end of the ridge portion 544 and is in communication with the opening 534 at the protrusion portion 530. Two C-shaped portions 543 extend from the opposing sides of the ridge portion 544 respectively and are embedded on the inner surfaces of the hollow cylinder 510. The C-shaped portions 543 are separated from and adjacent to the body 542.

According to the boot 500 of the present disclosure, the hollow cylinder 510 is made from elastic polymer and the shape-maintainable member 540 is made from shape-maintainable material, such as shape-maintainable polymer. According to the present disclosure, the shape-maintainable member 540 has a shape-maintenance property, which may be bent to a desired shape in subjection to an external mechanical force and still be kept in the desired shape even though the external mechanical force is removed. The shape-maintainable member 540 may be bent to an original shape with an appropriate mechanical force. In one embodiment, the shape-maintainable member 540 may be made from one material that is manufactured from polyethylene (PE) by Sekisui Chemical Company, Limited. In another embodiment, the shape-maintainable member 540 may be made from another material that is manufactured from shape-maintainable Polyethylene terephthalate (PET) disclosed in Taiwanese Application Number 101136342.

According to the boot 500 of the present disclosure, the hollow body 542 is embedded on the inner surfaces of the hollow cylinder 510 to prevent the detachment of the shape-maintainable member 540 from the hollow cylinder 510. The extending portions 541 are embedded on the inner surfaces of the hollow cylinder 510 and extend to the front end 516 of the hollow cylinder 510 such that the entrance end of the boot 500 may have enough elasticity. The elongated ridge portion 544 has a function of maintaining the shape of the boot 500 when the boot 500 is bent.

According to the boot 500 of the present disclosure, the front end 516 of the hollow cylinder 510 is configured to hold an optical fiber connector. Since the hollow body 542 has an axial breach 547 formed therein, pulls at the extending portions 541 may enlarge the hollow body 542. This way the hollow cylinder 510 may bond to the optical fiber connector more tightly. In addition, portions of hollow cylinder 510 cover the indentations 545, 546 of the shape-maintainable member 540 and fill the breach 547 in the hollow body 542 to help prevent the detachment of the shape-maintainable member 540 from the hollow cylinder 510.

According to the present disclosure, since the shape-maintainable member 540 has the property of shape maintenance, the boot 500 may be bent to a desired shape in subjection to an external mechanical force. When the boot 500 is bent, the ridge portion 544 will also be bent accordingly. The boot 500 may still be kept in the desired shape even though the external mechanical force is removed. The boot 500 may be bent to an original shape with an appropriate mechanical force.

Figure 3:
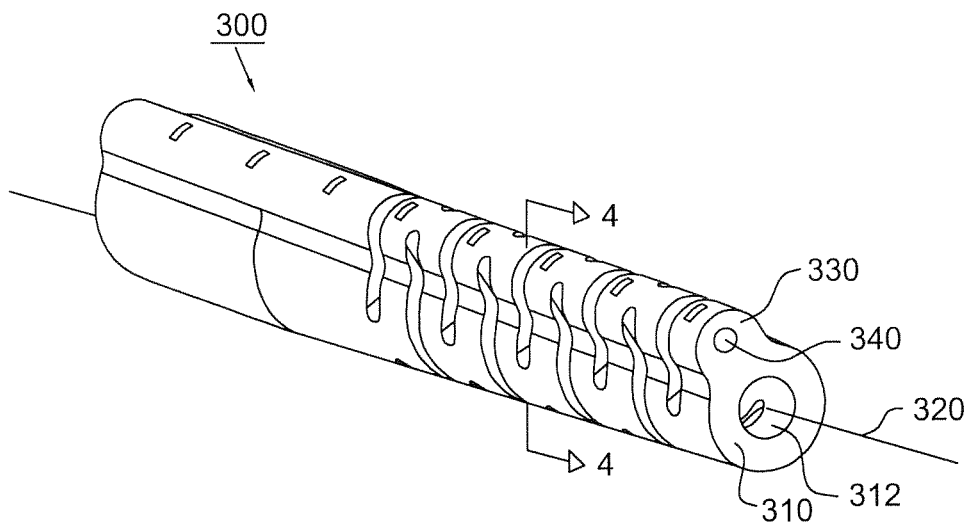
FIG. 3 is an elevated perspective view of a conventional flexibly bended boot for an optical fiber connector.
Figure 4:
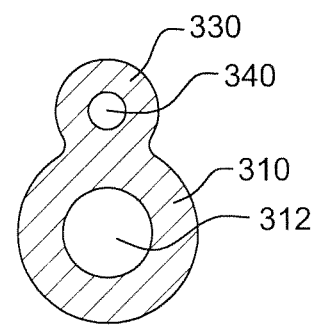
FIG. 4 is a cross-sectional view of a conventional flexibly bended boot for an optical fiber connector.
Figure 5:
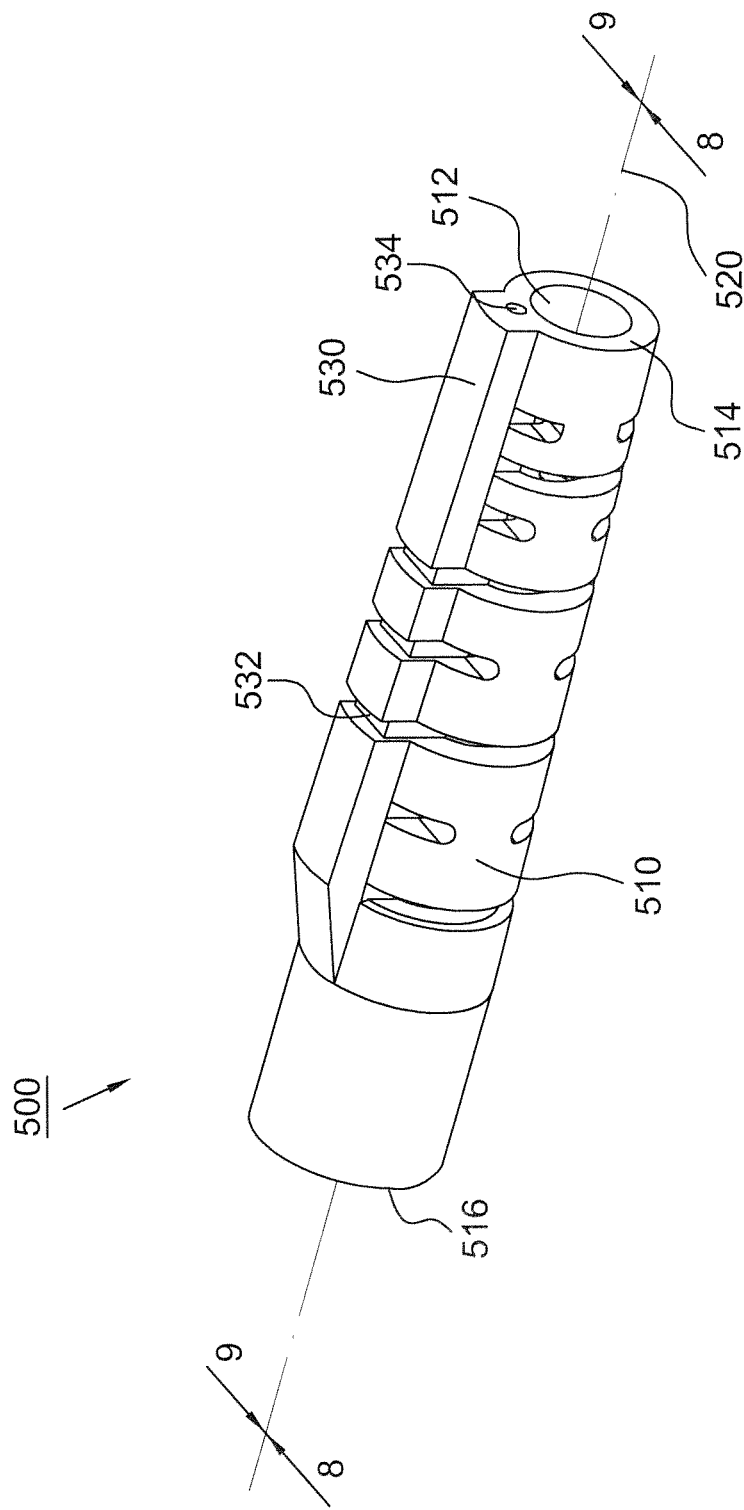
FIG. 5 is an elevated perspective view of the flexibly bended boot for an optical fiber connector according to the present disclosure.
Figure 6:
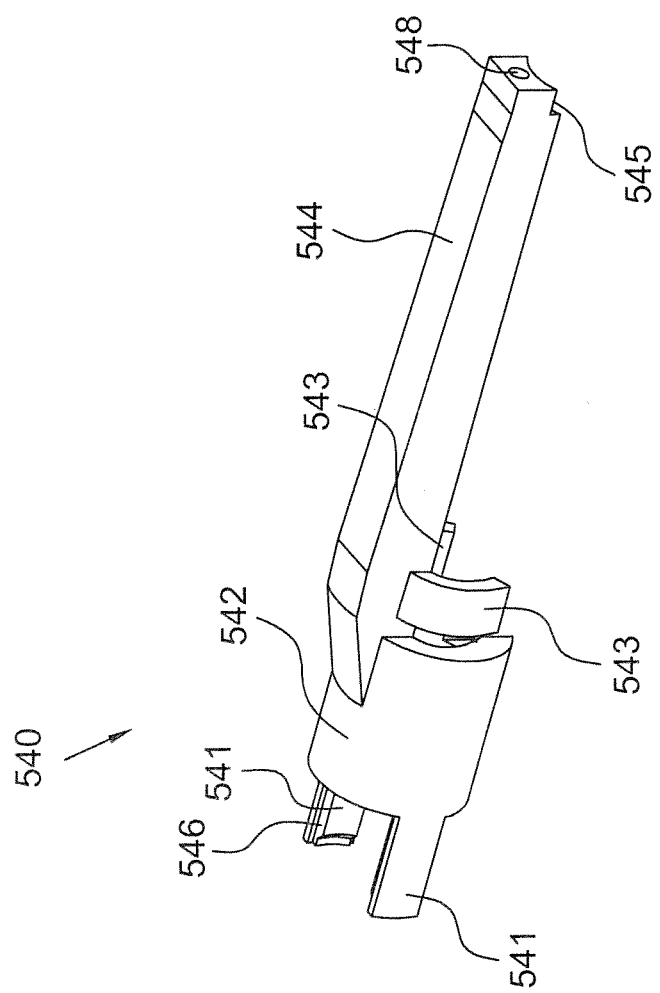
FIG. 6 is an elevated perspective view of the shape-maintainable member of the flexibly bended boot according to the present disclosure.
Figure 7:
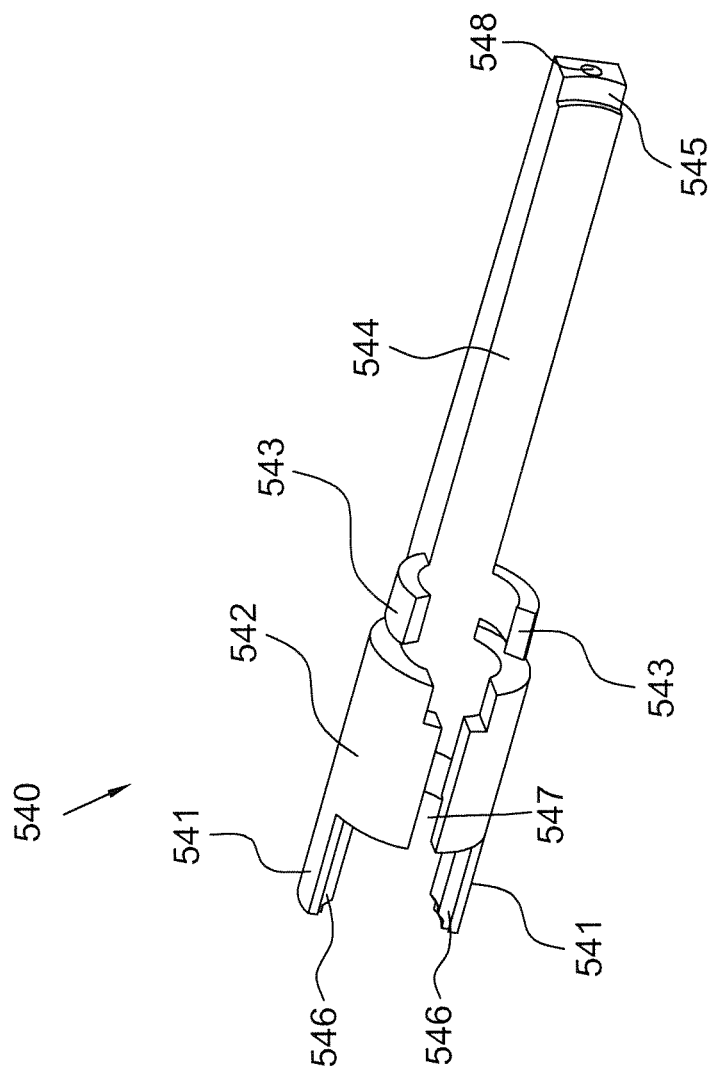
FIG. 7 is another elevated perspective view of the shape-maintainable member of the flexibly bended boot according to the present disclosure.
Figure 8:
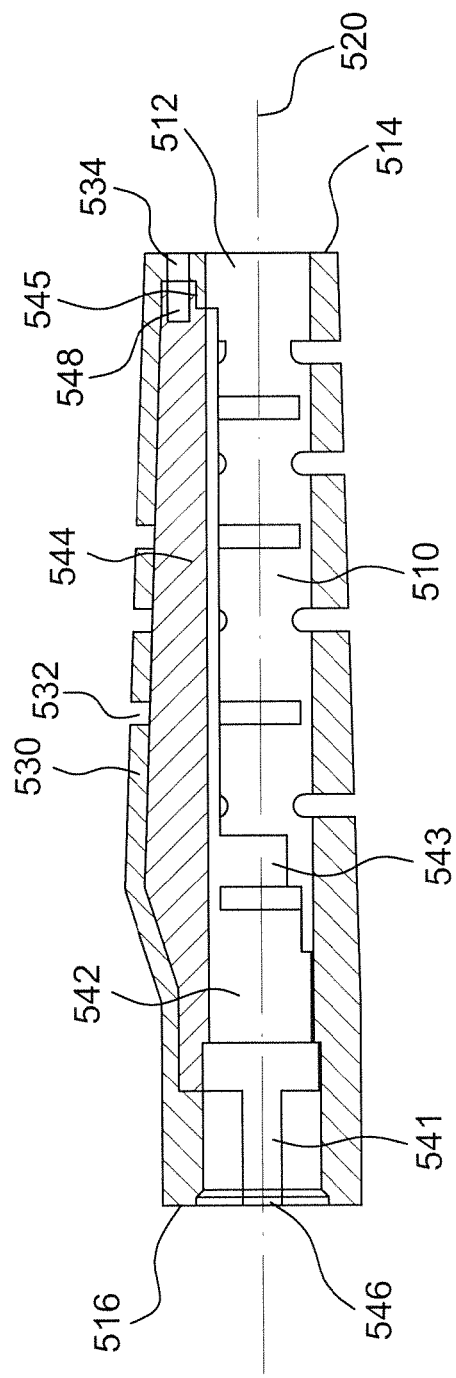
FIG. 8 is a cross-sectional view taken along line 8-8 in FIG. 5.
Figure 9:
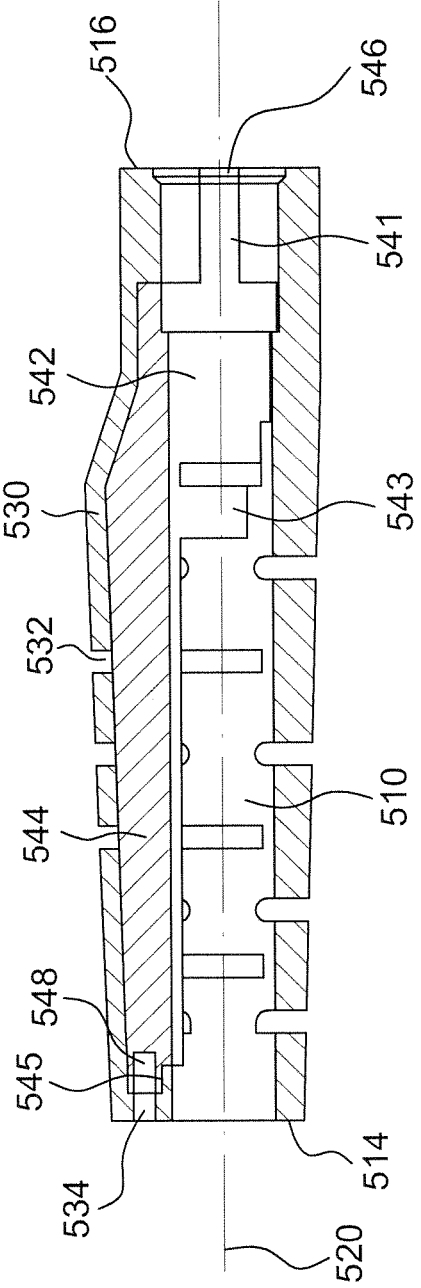
FIG. 9 is a cross-sectional view taken along line 9-9 in FIG. 5.

According to the present disclosure, both the hollow cylinder 510 and shape-maintainable member 540 are plastics. In other words, the hollow cylinder 510 and shape-maintainable member 540 may be constructed in mass production by injection molding. In addition, the bonding of these two elements is much strong in comparison with that of the cylindrical body 310 and iron wire 340 as illustrated in FIGS. 3 and 4. The ability of shape maintenance for the boot 500 may be adjusted by changing the thickness of shape-maintainable member 540, especially the thickness of the ridge portion 544. In order to construct the boot 500 well, the ridge portion 544 may be fixed by molds when the molten material of the hollow cylinder 510 is injected into the molds to bond with the shape-maintainable member 540. This may prevent the ridge portion 544 from being bent by mold flow during construction. The fixing at the ridge portion 544 by the molds therefore causes the formation of the grooves 532 and openings 534 at the protrusion portion 530.

It will be appreciated that the boot of the present disclosure may be used in any type of optical fiber connector, such as FC, SC or LC type connector.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A boot for an optical fiber connector, comprising:
   a hollow cylinder member having an inner surface configured to surround an optical fiber connected with the optical fiber connector; and
   a shape-maintainable member inserted in the hollow cylinder member, the shape-maintainable member being formed of a polymer material and coupled to bear against the inner surface of the hollow cylinder member, the shape-maintainable member being selectively bendable to hold the hollow cylinder member at a predetermined shape.

2. The boot as claimed in claim 1, wherein the shape-maintainable member engages the inner surface of the hollow cylinder member to protrude therefrom.

3. The boot as claimed in claim 1, wherein the shape-maintainable member is made from a shape-maintainable polymer selected from the group consisting of: polyethylene or polyethylene terephthalate.

4. The boot as claimed in claim 3, wherein the hollow cylinder member defines an axial direction, the shape-maintainable member including:
   a hollow body coaxially coupled to the hollow cylinder member, wherein the hollow body has opposing first and second ends; and
   a ridge portion extending from the first end of the hollow body in the axial direction, wherein the ridge portion is in contiguous contact with at least a portion of the inner surface of the hollow cylinder member.

5. The boot as claimed in claim 4, wherein the shape-maintainable member further includes:
two C-shaped portions extending from opposing sides of the ridge portions respectively, wherein the C-shaped portions are in contact with the inner surface of the hollow cylinder member.

6. The boot as claimed in claim 4, wherein the shape-maintainable member further includes:
two extending portions extending from the second end of the hollow body in the axial direction, wherein the extending portions are in contact with the inner surface of the hollow cylinder member.

7. The boot as claimed in claim 4, further including:
a protrusion portion coupled to an outer surface of the hollow cylinder member, wherein the ridge portion is further embedded in the protrusion portion.

8. The boot as claimed in claim 4, wherein the hollow body is formed with a slot extending in the axial direction, the slot defining a breach.

9. The boot as claimed in claim 8, wherein the breach extends from the first end of the hollow body to arrive at the second end of the hollow body.

10. The boot as claimed in claim 7, wherein at least one groove is formed within the protrusion portion to expose the ridge portion therethrough.

11. The boot as claimed in claim 4, wherein an indentation is formed within the ridge portion, the hollow cylinder member covers the indentation.

12. The boot as claimed in claim 6, wherein two indentations are formed along the extending portions respectively, the hollow cylinder member covers the indentations.

13. The boot as claimed in claim 8, wherein the hollow cylinder member is captured within the breach.

14. The boot as claimed in claim 7, wherein an opening is formed within the ridge portion, which is in communication with an opening formed at the protrusion portion.

15. The boot as claimed in claim 1, wherein the hollow cylinder member is made from elastic polymer.

\* \* \* \* \*